United States Patent [19]

Tamai

[11] Patent Number: 4,623,405
[45] Date of Patent: Nov. 18, 1986

[54] METALLIC MAGNETIC POWDER

[75] Inventor: Kiminori Tamai, Saku, Japan

[73] Assignee: TDK Corporation, Tokyo, Japan

[21] Appl. No.: 765,618

[22] Filed: Aug. 14, 1985

[30] Foreign Application Priority Data

Aug. 15, 1984 [JP]  Japan ................................. 59-169390

[51] Int. Cl.$^4$ ............................................. H01F 1/02
[52] U.S. Cl. ................................ 148/105; 75/0.5 AA; 75/251; 252/62.51; 427/127; 428/402; 428/692; 428/900; 360/134
[58] Field of Search ................ 75/122.1, 0.5 R, 0.5 A, 75/0.5 AA, 251; 252/62.51; 360/134; 148/105, 108; 427/127; 428/900, 692, 357, 402

[56] References Cited

U.S. PATENT DOCUMENTS

| | | | |
|---|---|---|---|
| 4,068,040 | 1/1978 | Yamada et al. | 428/900 |
| 4,431,604 | 2/1984 | Sata et al. | 419/35 |
| 4,501,795 | 2/1985 | Takeuchi et al. | 427/130 |
| 4,521,486 | 6/1985 | Ninomiya et al. | 428/900 |

Primary Examiner—Stephen J. Lechert, Jr.
Attorney, Agent, or Firm—Seidel, Gonda, Goldhammer & Abbott

[57] ABSTRACT

A metallic magnetic powder treated with an alkyl group-containing dicarboxylic acid so that the acid is deposited on the particle surfaces. The amount of the acid so deposited ranges from 0.5 to 5% on the basis of the weight of the starting powder.

7 Claims, 2 Drawing Figures

METALLIC MAGNETIC POWDER

BACKGROUND OF THE INVENTION

This invention relates to a metallic magnetic powder, and more specifically to a metallic magnetic powder for magnetic recording.

In recent years, with the progress of magnetic recording equipment, there has been demand for magnetic recording media capable of recording with higher density than heretofore. As an effort to meet this demand, metallic magnetic powders have been proposed and employed which excel the oxide type magnetic powders in both coercive force and saturation magnetic flux density. However, the acicular particles of the powders are so short, less than one micron in length, and chemically so active that they tend to be oxidized in air with a gradual decrease in the saturation magnetic flux density, thus posing the problem of inadequate shelf stability.

Attempts to improve their oxidation stability so as to settle the foregoing problem have been made, for example, by oxidizing the metallic magnetic particle surfaces and thereby forming an oxide film thereon or by coating the metallic magnetic particles with various substances. The attempts made so far have included, for instance, forming a magnetic film on the metallic magnetic particle surfaces (Japanese Patent Application Public Disclosure No. 114769/1978), forming a higher fatty acid film thereon (Japanese Patent Application Public Disclosure No. 97738/1974), or depositing an amino-modified silicone oil (Japanese Patent Application Public Disclosure No. 77270/1979) or boron trialkoxide on the particles (Japanese Patent Application Public Disclosure No. 9802/1982). Still, these methods have not sufficiently rendered the metallic magnetic powders stable to oxidation, causing the powders to undergo serious deterioration of their magnetic properties in high-temperature, high-humidity atmospheres. For these reasons further improvements in the oxidation stability of the powders are being called for.

The present invention is based upon the discovery, arrived at after extensive investigations on ways of improving the oxidation stability of metallic magnetic powders, that a marked improvement is achieved by treating the particle surfaces with an alkyl group-containing dicarboxylic acid for its deposition thereon.

SUMMARY OF THE INVENTION

It is an object of the present invention to provide a metallic magnetic powder having excellent oxidation stability.

A more concrete object of the invention is to provide a metallic magnetic powder which exhibits oxidation stability for long time in high-temperature, high-humidity conditions and which is suited especially for use in the manufacture of magnetic recording media.

The metallic magnetic powder according to the invention is characterized by the deposition of an alkyl group-containing dicarboxylic acid on the particle surfaces. With the structure in accordance with the invention the foregoing objects are realized.

DETAILED DESCRIPTION OF THE INVENTION

Figure 1:
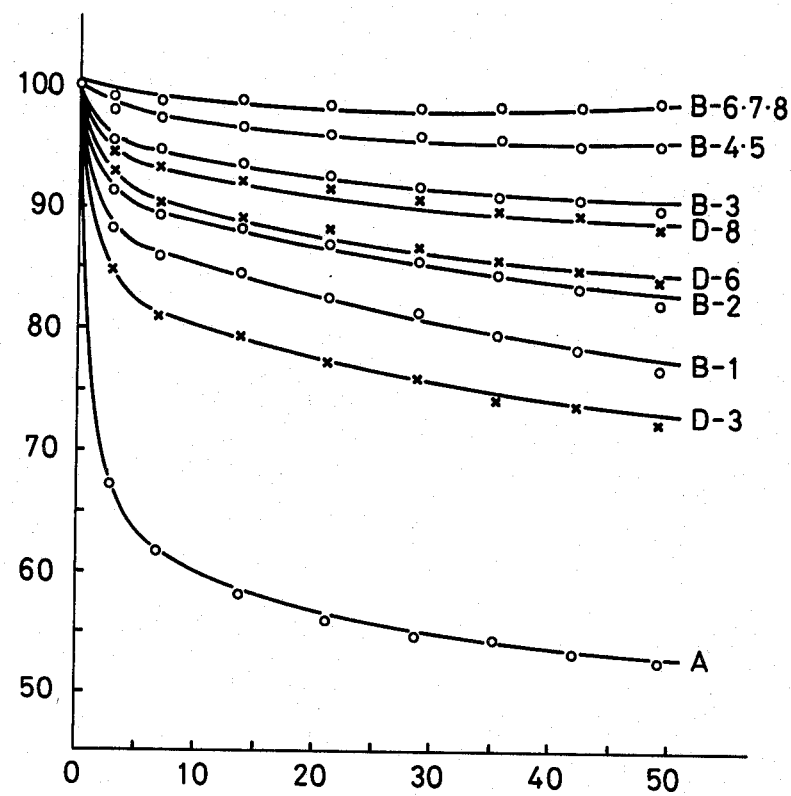
FIG. 1 is a graphic representation of changes with time of the saturation magnetic flux densities of specimens allowed to stand in an atmosphere at a temperature of 60° C. and a relative humidity of 90%.

The metallic magnetic powder for use in the present invention may be any of known metallic magnetic powders in use for magnetic recording media including, notably, fine powders of iron-cobalt, iron-cobalt-nickel, and iron-cobalt-chromium alloys.

There exist varied alkyl group-containing dicarboxylic acids usable for the present invention. Preferred among them are those acids whose alkyl groups have 3 to 7 carbon atoms and whole total carbon number ranges from 20 to 30. Useful examples are aliphatic, saturated dicarboxylic acids, such as malonic acid, adipic acid, and sebacic acid; aliphatic, unsaturated dicarboxylic acids, such as maleic acid and fumaric acid; and and aromatic dicarboxylic acids, such as phthalic acid and isophthalic acids, with straight- or branched-chain $C_{1-7}$ alkyl groups introduced therein. Typical of commercially available products is the one marketed under the trade designation "DA-1550" by Harima Chemical Ind. Co.

The dicarboxylic acid is added in a small amount to the metallic magnetic powder. If the amount is too small, it will not contribute oxidation stability. Generally, on the basis of the weight of the metallic magnetic powder, 0.1% or more of the acid should be deposited. As the acid proportion increases, the effect of oxidation stability will become saturated. Since an excessive dicarboxylic acid content is detrimental to the magnetic properties of the resulting powder and the tendency is achieved by excessive deposition of the acid, there are certain limits to the usage. For instance, when the "DA-1550" is employed, about 0.1% of it begins to prove effective, and 0.5% or more will cause far less changes with time of the metallic magnetic powder than the untreated powder. The larger the amount of the dicarboxylic acid the greater the oxidation stability will become, until the favorable effect is saturated with the addition of approximately 5%. On the other hand, the magnetic properties of the powder undergo almost no change with up to about 5% of the acid. Beyond the level, however, the properties decline sharply and with 10% the saturation magnetic flux density decreases by nearly 10%. Thus, while it depends upon the chemical structure of the acid itself the amount of the dicarboxylic acid to be used ranges from 0.1 to 10%, preferably from 0.5 to 5%.

The invention is illustrated by the following Example as well as by Comparative Examples.

COMPARATIVE EXAMPLE 1

Five liters of a sodium boron hydride solution at a concentration of 1.0 mol/l was added to 5 l of a mixed solution comprising 0.5 mol/l each of ferrous sulfate and cobalt sulfate. The whole mixed solution was allowed to react in a magnetic field of 2000 G to obtain a metallic magnetic powder. The powder is referred to herein as Specimen A.

EXAMPLE 1

Specimen A of metallic magnetic powder, obtained in Comparative Example 1, was placed in varied amounts into 500 g portions of a solution of the above-mentioned "DA-1550" at a proper concentration in toluene. The powder in each portion of the solution was thoroughly dispersed in a nitrogen gas atmosphere. The dispersion was heated to about 90° C. to vaporize toluene, leaving behind a metallic magnetic powder on which an alkyl group-containing dicarboxylic acid was deposited. Specimens obtained in this way were separated by the amount of the "DA-1550" contained. The specimens containing 0.1, 0.2, 0.5, 1, 3, 5, 7, and 10% by weight of the acid, based on the weight of the metallic magnetic powder, where labeled, respectively, Specimens B-1, B-2, B-3, B-4, B-5, B-6, B-7, and B-8.

COMPARATIVE EXAMPLE 2

Specimen A of metallic magnetic powder, obtained in Comparative Example 1, was placed in varied amounts into 500 g portions of a solution of trimethyl borate at a proper concentration of toluene. The powder in each portion of the solution was thoroughly dispersed in a nitrogen gas atmosphere. The dispersion was heated to about 90° C. to vaporize toluene and leave behind a metallic magnetic powder on which trimethyl borate was deposited. Specimens obtained in this way were separated by the amount of trimethyl borate contained. The specimens containing 0.5, 5, and 10% by weight of the borate, based on the weight of the powder, was labeled D-3, D-6, and D-8, respectively.

The metallic magnetic powders obtained in the above Comparative Examples and Example of the invention were allowed to stand in an atmosphere under identical conditions, or at 60° C. and 90% RH. Changes in the saturation magnetic flux densities they underwent with the lapse of time during the standing period (measured by a vibrating magnetometer with an applied magnetic field of 10 KOe) were as graphically represented in FIG. 1. The initial saturation magnetic flux densities of the metallic magnetic powders are shown in FIG. 2.

Figure 2:
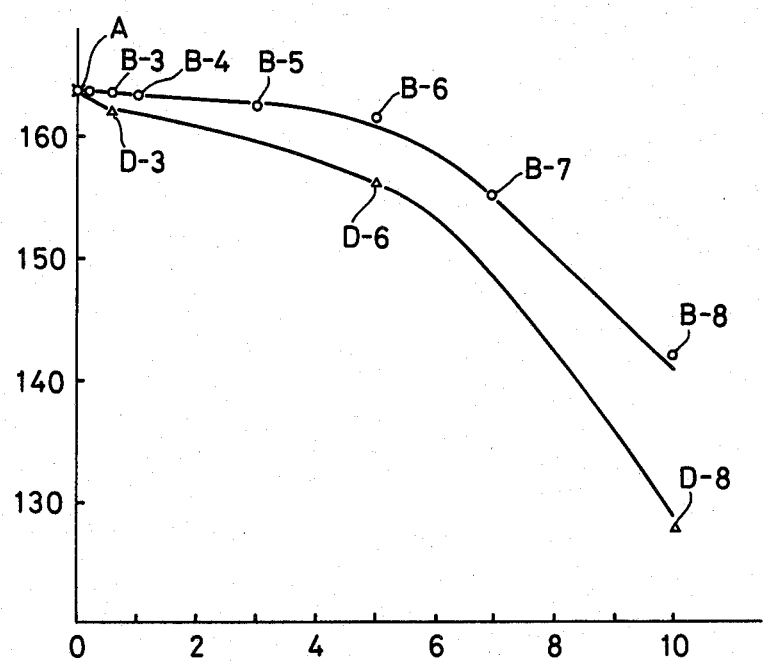
FIG. 2 is a graph showing the relationship between the amounts of additives deposited on the particle surfaces of specimens and the initial saturation magnetic flux densities of the specimens.

As can be seen from FIG. 1, the specimens of metallic magnetic powder treated with the alkyl group-containing dicarboxylic acid for deposition thereon were thereby remarkably improved in oxidation stability over the untreated powder specimen. They attained, according to the graph, even better oxidation stability than those treated with the boric trialkoxide generally believed effective in achieving oxidation stability. In this case, in order to lessen the changes in saturation magnetic flux density, it is apparently desirable to use the dicarboxylic acid in an amount of 0.5% or upward. Also, FIG. 2 indicates that the metallic magnetic powders treated with the alkyl group-containing dicarboxylic acid undergo less decreases in the initial saturation magnetic flux density with the increasing amounts of the deposited acid than the metallic magnetic powders treated with the boric trialkoxide. In the case of the alkyl group-containing dicarboxylic acid, the amount to be deposited on the powder should not exceed 5% because it would given an undesirable result, with material reduction in the initial saturation magnetic flux density. Thus, an appropriate amount of the alkyl group-containing dicarboxylic acid to be deposited is in the range from 0.5 to 5%.

As described above, the metallic magnetic powder according to this invention is suited for use in magnetic recording media.

What is claimed is:

1. A metallic magnetic powder treated with an alkyl group-containing dicarboxylic acid so that the acid is deposited on the particle surfaces.

2. A metallic magnetic powder according to claim 1 wherein the amount of the alkyl group-containing dicarboxylic acid deposited on the particle surfaces ranges from 0.1 to 10% on the basis of the weight of the starting metallic magnetic powder.

3. A metallic magnetic powder according to claim 2 wherein the amount of the alkyl group-containing dicarboxylic acid ranges from 0.5 to 5% on the basis of the weight of the starting metallic magnetic powder.

4. A metallic magnetic powder according to claim 1 wherein said powder is for magnetic recording media.

5. A metallic magnetic powder according to claim 1 wherein said metallic magnetic powder is selected from iron-cobalt, iron-nickel-cobalt and iron-cobalt-chromium alloys.

6. A metallic magnetic powder according to claim 1 wherein said alkyl group of the alkyl group-containing dicarboxylic acid is selected from the group consisting of straight-or branched chain alkyls having carbon atoms of 3 to 7.

7. A metallic magnetic powder according to claim 6 wherein the acid of the alkyl group-containing dicarboxylic acid is selected from the group consisting of malonic acid, adipic acid, sebacic acid, maleic acid, fumaric acid, phthalic acid and isophthalic acid.

* * * * *